(12) United States Patent
Murrell

(10) Patent No.: US 12,000,481 B1
(45) Date of Patent: Jun. 4, 2024

(54) ATTACHMENT DEVICE

(71) Applicant: Thomas A. Murrell, Seattle, WA (US)

(72) Inventor: Thomas A. Murrell, Seattle, WA (US)

(*) Notice: Subject to any disclaimer, the term of this patent is extended or adjusted under 35 U.S.C. 154(b) by 86 days.

(21) Appl. No.: 17/666,734

(22) Filed: Feb. 8, 2022

(51) Int. Cl.
| | |
|---|---|
| *F16H 7/08* | (2006.01) |
| *F16C 13/00* | (2006.01) |
| *F16C 35/073* | (2006.01) |
| *F16C 41/04* | (2006.01) |
| *F16H 7/20* | (2006.01) |
| *F16H 55/36* | (2006.01) |

(52) U.S. Cl.
CPC .......... *F16H 7/08* (2013.01); *F16C 13/006* (2013.01); *F16C 35/073* (2013.01); *F16C 41/04* (2013.01); *F16H 7/20* (2013.01); *F16H 55/36* (2013.01); *F16C 2361/63* (2013.01); *F16H 2007/0865* (2013.01); *F16H 2007/0878* (2013.01)

(58) Field of Classification Search
CPC ... F16H 7/08; F16H 7/20; F16H 55/36; F16H 2007/0865; F16H 2007/0878; F16C 13/006; F16C 35/073; F16C 41/04; F16C 2361/63
USPC .......................................... 474/166
See application file for complete search history.

(56) References Cited

U.S. PATENT DOCUMENTS

| | | | | |
|---|---|---|---|---|
| 653,313 | A * | 5/1900 | Raifsnyder | |
| 1,024,344 | A * | 4/1912 | Langvin | F16D 1/096 411/432 |
| 1,201,863 | A * | 10/1916 | Orey | F16B 2/065 403/379.3 |
| 2,642,299 | A * | 6/1953 | Deardorff | F15B 15/24 403/377 |
| 3,106,101 | A * | 10/1963 | Harriman | F16H 55/30 474/96 |
| 4,006,993 | A * | 2/1977 | Woerlee | F16H 55/17 403/404 |
| 4,504,249 | A | 3/1985 | Fortier et al. | |
| 4,525,094 | A * | 6/1985 | Johnson | F16D 1/096 403/370 |
| 5,888,158 | A * | 3/1999 | Wilcher | F16H 55/30 474/98 |
| 6,478,504 | B1 * | 11/2002 | Dawson | F16D 1/0876 474/183 |
| 7,090,065 | B2 | 8/2006 | Whipple et al. | |
| 7,329,197 | B2 | 2/2008 | Gearhart et al. | |
| 9,816,597 | B2 | 11/2017 | Invernizzi et al. | |
| 10,082,200 | B2 | 9/2018 | Lescorail et al. | |
| 2009/0298630 | A1 | 12/2009 | Mineno et al. | |
| 2012/0230758 | A1 * | 9/2012 | Widenmeyer | F16D 1/0847 403/290 |
| 2016/0356375 | A1 | 12/2016 | Chollet et al. | |
| 2020/0141479 | A1 * | 5/2020 | Feuerborn | F16H 55/42 |

* cited by examiner

*Primary Examiner* — Gene O Crawford
*Assistant Examiner* — Emily R Kincaid
(74) *Attorney, Agent, or Firm* — Cramer Patent & Design PLLC; Aaron R. Cramer

(57) ABSTRACT

An attachment device is split collar that surrounds a conventional keyway or setscrews. The split collar arrangement is equipped with either two or four bolts (one or two per side) depending on the overall size of the invention. In the case of use on a keyway, one half of the invention has a groove to hold the keyway in position. As the bolts of the invention are tightened down, the keyway becomes locked in place.

1 Claim, 6 Drawing Sheets

ATTACHMENT DEVICE

RELATED APPLICATIONS

None.

FIELD OF THE INVENTION

The present invention relates generally to a system and method by which gears, pulleys, and similar devices are attached to a shaft with or without the use of keyways or setscrews.

BACKGROUND OF THE INVENTION

Just about all mechanical equipment relies on rotating shafts that utilize gears, pulleys and other attachments. These arrangements are commonly found on motor vehicles, farm equipment, recreational equipment, heavy duty industrial equipment and the like. The mechanical connection between the shaft and the gear, pulley or the like is commonly facilitated with a keyway and key or a setscrew arrangement. While such methods have been in use in for generations, they are not without their disadvantages. First and foremost, keys and setscrews typically become loose over time, generating "slop" or "play" that allows the gear or pulley to move on the shaft. This generates problems such as noise, loss of calibration, metal fatigue and the like.

Second, when such devices fail, they typically require replacement of the pulley or gear as well as perhaps the shaft, resulting in large repair costs. Finally, such devices are difficult to apply and remove, especially in cramped locations, or after long periods of time. Accordingly, there exists a need for a means by which a shaft and shaft mounted device such as a gear or pulley can be mechanically fastened together without the disadvantages as described above. The development of the attachment device fulfills this need.

SUMMARY OF THE INVENTION

In order to overcome the defects of the existing prior art, the invention provides an attachment device, that has, a rotating element having a central hub with a continuous base and a removable collar, and a shaft rotating in a rotational travel direction. The rotating element is attached to the shaft.

The central hub may include the continuous base and the removable collar and may be centrally located within the rotating element. The rotating element may be selected from the group consisting of a pulley, a gear, a coupling, a clutch, or a sprocket. The continuous base may be semicircular-shaped. The removable collar may be semicircular-shaped. The removable collar may be held in place to the continuous base by a plurality of threaded fasteners. The threaded fasteners may be installed within a plurality of recessed areas on the removable collar. The recessed areas may be disposed on an outer surface of the removable collar while a shaft surface and a key slot may be disposed on an inner side or an opposing side of the removable collar and may accept a key and prevents the rotational travel direction between the rotating element and the shaft. An overall length of the recessed areas may be lengthened to accommodate a pair of the threaded fasteners per side.

The threaded fasteners may be passed through a plurality of corresponding through holes disposed on the removable collar and may be secured into the threaded holes disposed on the continuous base. The threaded fasteners may be selected from the group consisting of a plurality of threaded screws, a plurality of threaded bolts, a plurality of threaded Torx screws, or a plurality of threaded Allen head screws. The rotating element may include a continuous central hub without the continuous base, the key, and the removable collar. The shaft may be inserted into the continuous central hub of the rotating element and may be retained therein. The rotational travel direction may be a clockwise direction. The rotational travel direction may be a counterclockwise direction. The rotating element may be attached to the shaft with a keyway. The removable collar may impinge upon and may hold a conventional key installed in the keyway on the shaft. The impinging removable collar by the threaded fasteners may form a contact area on the conventional key and the shaft on the continuous base.

The contact area may produce a friction fit and results in the rotating element being affixed to the shaft that may remain structurally sound at a plurality of speeds and torques applied by or received by the shaft. The shaft may utilize the conventional key within the keyway to prevent any unwanted rotational motion.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
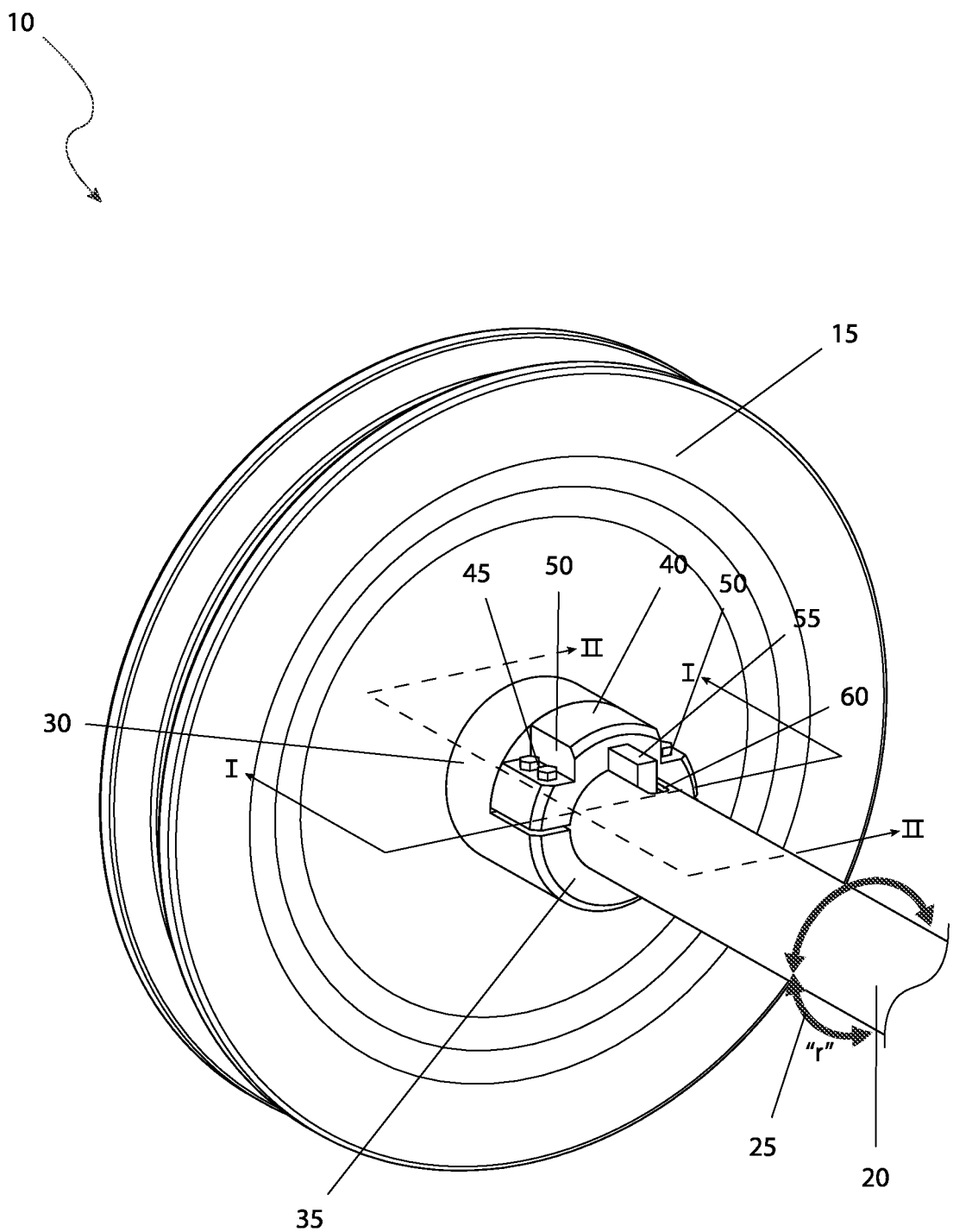
FIG. 1 is a perspective view of the attachment device for keyed shafts, according to the preferred embodiment of the present invention.

DESCRIPTIVE KEY 10 attachment device
15 rotating element
20 shaft
25 rotational travel direction "r"
30 central hub
35 base
40 removable collar
45 threaded fastener
50 recessed area
55 key
60 keyway
65 through hole
70 threaded hole
75 shaft surface
80 key slot
85 axial travel path "a"
90 space

DESCRIPTION OF THE PREFERRED EMBODIMENTS

Figure 3:
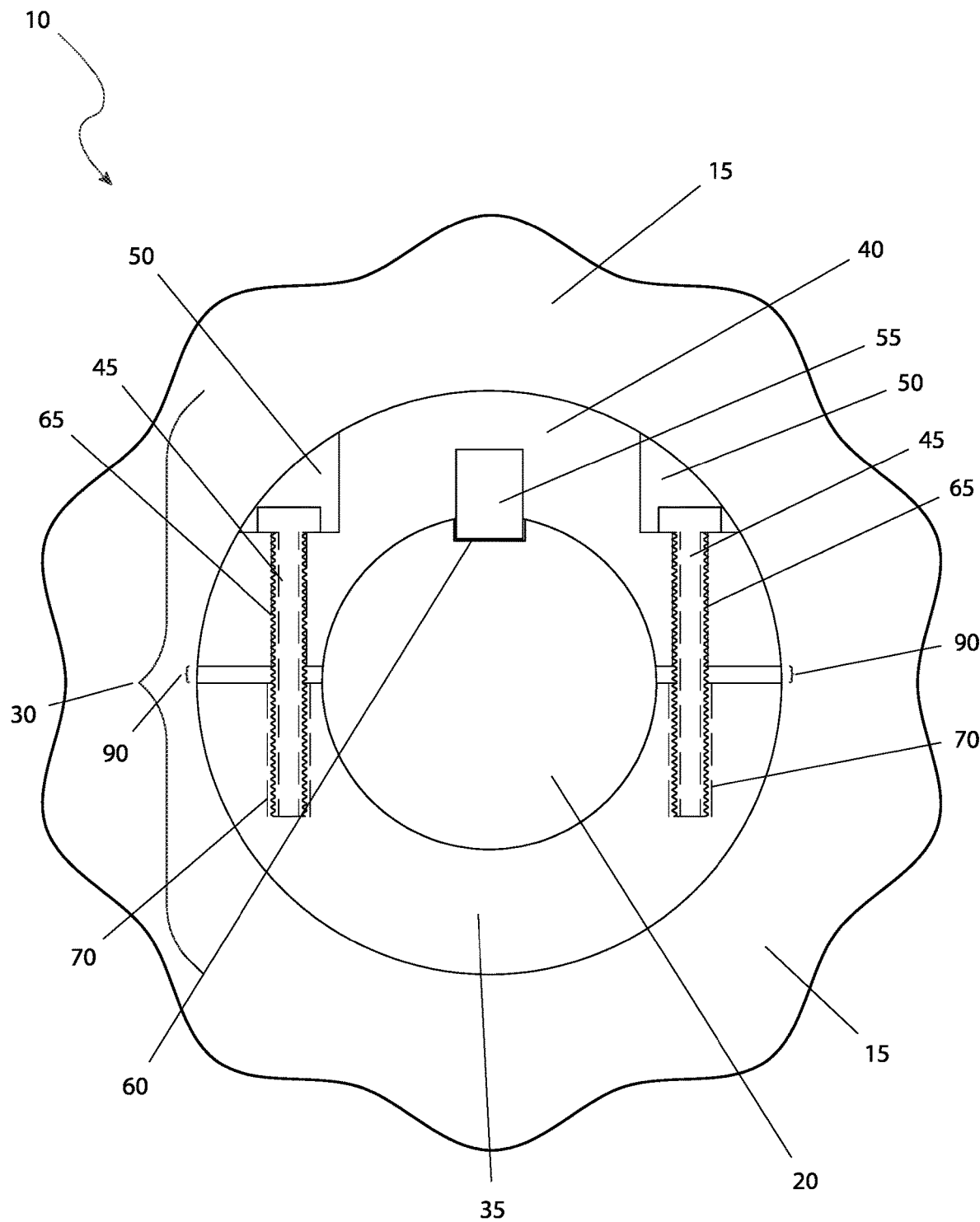
FIG. 3 is a sectional view of the attachment device, as seen along a Line I-I, as shown in FIG. 1, according to the preferred embodiment of the present invention.
Figure 4:
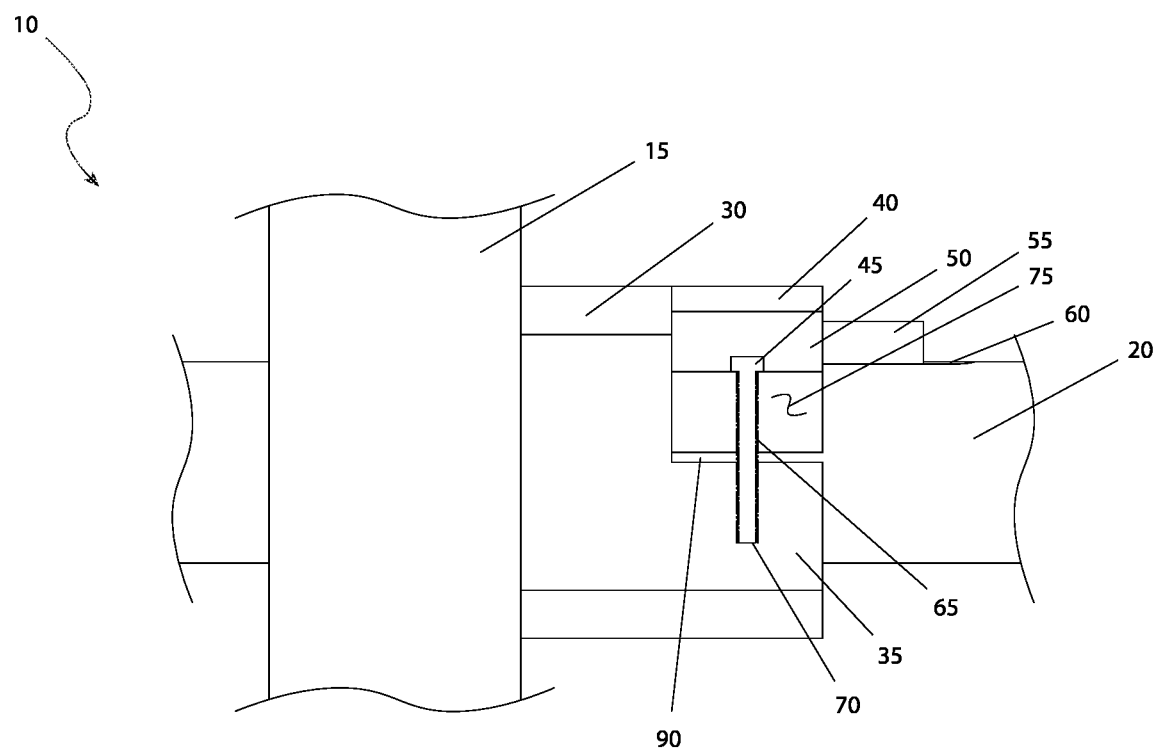
FIG. 4 is a sectional view of the attachment device, as seen along a Line II-II, as shown in FIG. 1, according to the preferred embodiment of the present invention.
Figure 5:
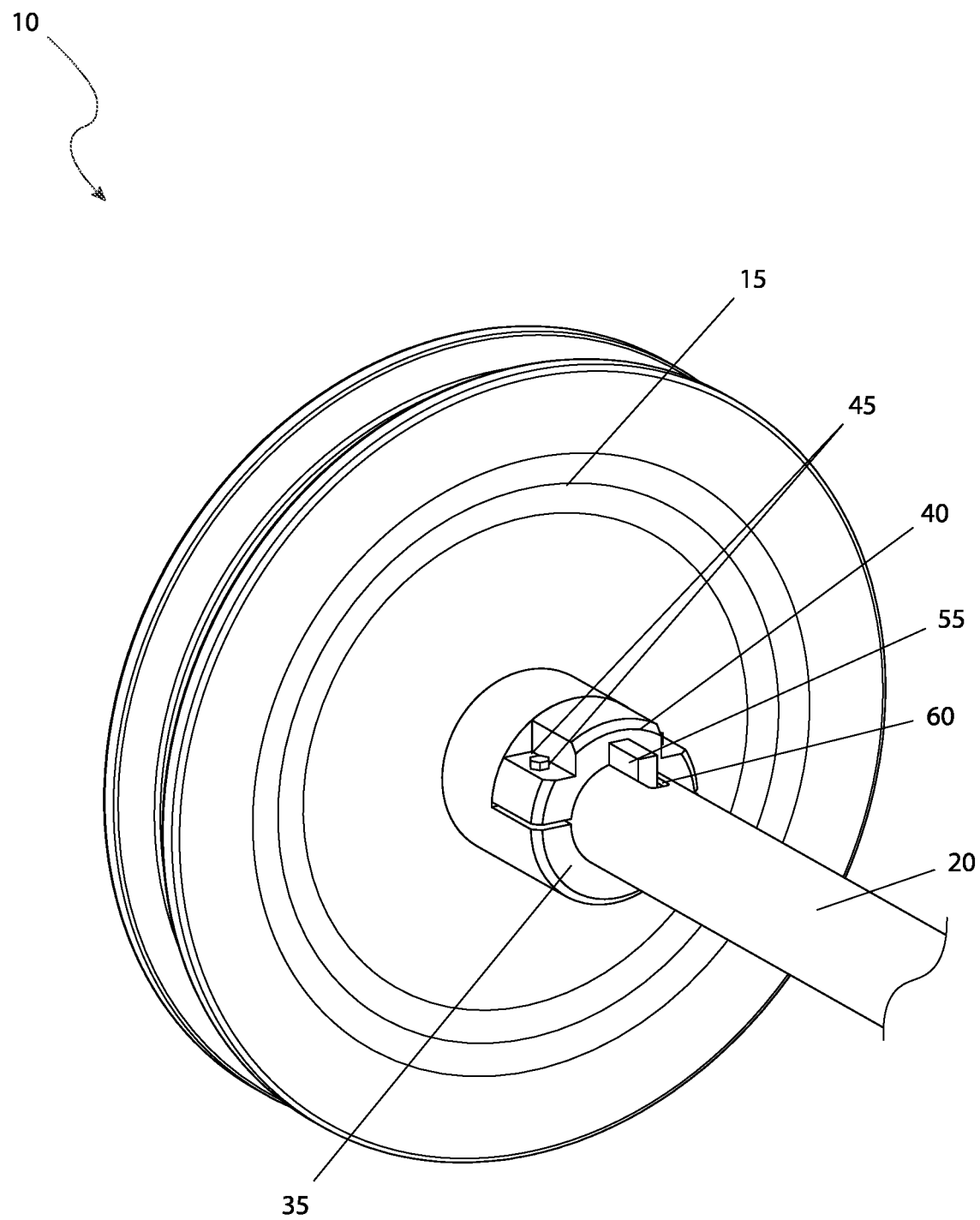
FIG. 5 is a perspective view of the attachment device, according to an alternate embodiment of the present invention.
Figure 6:
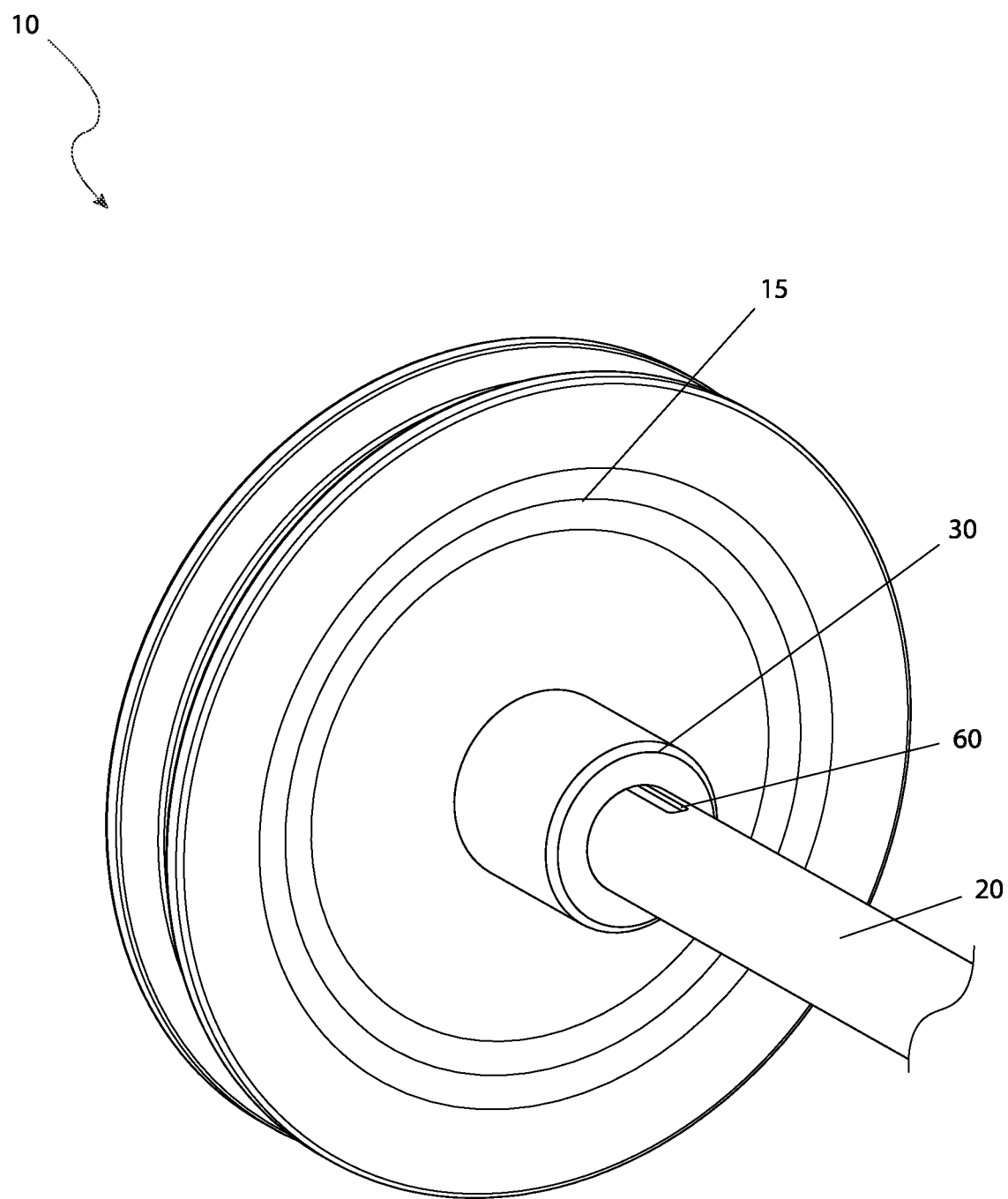
FIG. 6 is a perspective view of the attachment device, according to an alternate method of use of the preferred embodiment of the present invention.

The best mode for carrying out the invention is presented in terms of its preferred embodiment herein depicted within FIGS. 1 through 4, in an alternate embodiment herein depicted in FIG. 5 and in an alternate method of use herein depicted in FIG. 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a perspective view of the attachment device 10, according to the preferred embodiment of the present invention is disclosed. The attachment device (herein also described as the "device") 10, provides a system and method by which a rotating element 15, such as a pulley, a gear, a coupling, a clutch, a sprocket and similar devices are attached to a shaft 20 with the use of a keyway 60. A rotating element 15 such as a pulley, gear, coupling, clutch, sprocket or similar device (herein depicted as a pulley for purposes of illustration) is secured to a shaft 20 and undergoes a rotational travel direction "r" 25 in either a clockwise or counterclockwise direction. The rotating element 15 is provided with a central hub 30 that includes a continuous base 35 and a removable collar 40. Both the base 35 and the removable collar 40 are semicircular in design. The removable collar 40 is held in place to the base 35 by at least two (2) threaded fasteners 45 such as screws, bolts, Torx® screws, Allen head screws, or the like. Note that only one (1) threaded fasteners 45 is shown in FIG. 1, due to illustrative limitations. The exact type and quantity of threaded fasteners 45 used with the present invention is not intended to be a limiting factor of the present invention. The threaded fasteners 45 are installed within recessed areas 50 on the removable collar 40. The removable collar 40 impinges upon and holds a conventional key 55 installed in a keyway 60 on the shaft 20. As such, the impinging action of the removable collar 40 by the threaded fasteners 45 forms a large contact area on the key 55 and associated shaft 20 on the base 35 of the device 10. The contact area produces a tight friction fit and results in the rotating element 15 being firmly affixed to the shaft 20. This fit remains structurally sound at all speeds and torques applied by or received by the shaft 20. As such, the teachings of the device 10 provide for an enhanced connection between the rotating element 15 and the shaft 20 when compared to other methods such as a keyway alone, a setscrew or the like.

Figure 2:
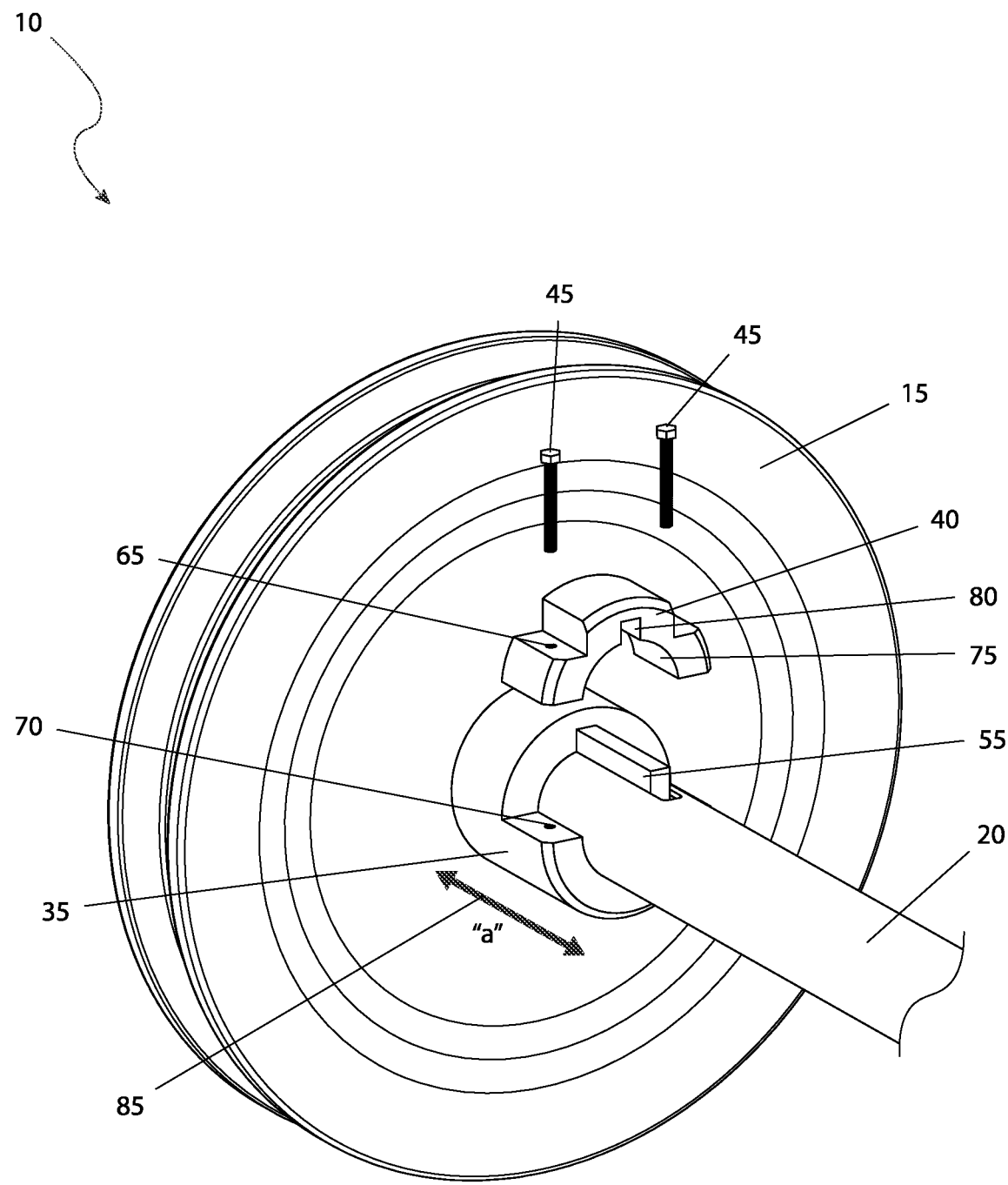
FIG. 2 is a perspective view of the attachment device, shown in a disassembled state, according to the preferred embodiment of the present invention.

Referring next to FIG. 2, a perspective view of the device 10, shown in a disassembled state, according to the preferred embodiment of the present invention is depicted. Both of the threaded fasteners 45 are pass through holes 65 in the removable collar 40 and are secured into threaded holes 70 in the base 35. Note that at least two (2) through hole(s) 65 and two (2) threaded holes 70 are provided, although only one (1) each is shown in FIG. 2 due to illustrative limitations. The recessed areas 50 is present on the outer surface of the removable collar 40 while a shaft surface 75 and a key slot 80 is provided on the inner or opposing side. The key slot 80 accepts the key 55 and prevents any rotational travel direction "r" 25 (as shown in FIG. 1) between the rotating element 15 and the shaft 20. It is also envisioned that the connection provided by the device 10 may be duplicated on the opposite side of the rotating element 15 for a higher level of mechanical strength. Finally, the connection provided by the device 10 prevents any axial movement along an axial travel path "a" 85. It is noted that the device 10 would function in a similar manner without the presence of a key 55 or keyway 60 as the increased surface contact area between the shaft surface 75 and the shaft provides a much higher resistance to slippage (also known as "slop" or "play") when compared to the use of set screws alone.

Referring now to FIG. 3, a sectional view of the device 10, as seen along a Line I-I, as shown in FIG. 1, according to the preferred embodiment of the present invention is shown. The central hub 30, consisting of primarily the base 35 and the removable collar 40, is centrally located with the rotating element 15, here partially shown. The shaft 20 utilizes the key 55 within the keyway 60 to prevent any unwanted rotational motion. Impingement upon the shaft 20 is accomplished via a space 90 between the base 35 and the removable collar 40. The recessed areas 50 provide a parallel surface to the space 90 to allow for proper and consistent alignment.

Referring next to FIG. 4, a sectional view of the device 10, as seen along a Line II-II, as shown in FIG. 1, according to the preferred embodiment of the present invention is disclosed. This view provides a clear indication of the large amount of surface area provided by the central hub 30 along with the base 35 and the removable collar 40 and the ability of the device 10 to prevent movement between the rotating element 15 and the shaft 20 along the rotational travel direction "r" 25 (as shown in FIG. 1). The key 55 is in contact with the shaft 20 via the keyway 60 for the greater majority of the length of the key 55. Such a contact area afforded by the key 55 as well as the contact area between the shaft surface 75 of the removable collar 40 and the shaft 20 itself provides a much larger area than provided by the typical connection method of a setscrew alone. The through holes 65 in the removable collar 40 and the threaded holes 70 in the base 35 are visible in this figure. The threaded fasteners 45 engage the removable collar 40 on the recessed areas 50 and produce while minimizing the space 90 between the base 35 and the removable collar 40.

Referring to FIG. 5, a perspective view of the device 10, according to an alternate embodiment of the present invention is disclosed. The alternate embodiment of FIG. 5 is generally identical to that of the preferred embodiment of FIG. 1, with the exception of two (2) threaded fasteners 45 per each side of the removable collar 40 for a total of four (4) (note that only two (2) are visible in FIG. 5 due to illustrative limitations. The overall length of the recessed areas 50 may be lengthened to accommodate the two (2) threaded fasteners 45 per side. The applications of the alternate embodiment would be those instances where higher speed (Revolutions per minute (RPM)) or torque would be present. The remaining parameters and configuration of the preferred embodiment such as the base 35, the rotating element 15, the shaft 20, the key 55 and the keyway 60 would remain. The presence of the through holes 65 (as shown in FIG. 2) and the threaded holes 70 (as shown in FIG. 2) would be modified in quantity accordingly.

Referring now to FIG. 6, a perspective view of the device 10, according to an alternate method of use is disclosed. The device 10 can be utilized to provide stability and alignment for rotating elements 15 such as idler wheels. In such an alternate method of use, such a rotating element 15 would have a continuous central hub 30 and no base 35 and as such, the key 55 and removable collar 40 would not be needed. The shaft 20 would be inserted into the central hub 30 of the rotating element 15 and be retained therein. Other embodiments can be provided where the central hub 30 of the rotating element 15 that is an idler wheel may have a base 35 and therefore require the removable collar 40 for securing the shaft 20 thereto.

2. OPERATION OF THE PREFERRED EMBODIMENT

The preferred embodiment of the present invention can be utilized by the common user in a simple and effortless manner with little or no training. It is envisioned that the device 10 would be constructed in general accordance with FIG. 1 through FIG. 6. The user would procure the device 10 from conventional procurement channels such as hardware stores, mechanical supply houses, automotive supply stores, home improvement stores, mechanical supply houses, mail order and internet supply houses and the like. Special attention would be paid to the use of the preferred or alternate embodiment, type of rotating element 15, diameter of the shaft 20, power transmission requirements and the like.

After procurement and prior to utilization, the device 10 would be prepared in the following manner: the rotating element 15, complete with the central hub 30 and the base 35, would be placed into position on the shaft 20; the key 55 would be inserted into the keyway 60 of the shaft 20; the removable collar 40 would be placed over the shaft 20 such that the shaft surface 75 contacts the shaft 20 and the key slot 80 engages the key 55; the two (2) threaded fasteners 45 of the preferred embodiment or the four (4) threaded fasteners 45 of the alternate embodiment would be inserted through the through holes 65 of the removable collar 40 and engaged in the threads of the threaded holes 70; and finally, the threaded fasteners 45 would be properly tightened. At this point in time, the device 10 is ready for use.

During utilization of the device 10, the following procedure would be initiated: the device 10 will operated in a transparent manner when compared to other methods of attaching a rotating element 15 to a shaft 20, with the enhanced benefit of no play, slop or side travel. The device 10 is intended to remain in place for the life of the machine or equipment upon which the device 10 is utilized upon.

The features of the device 10 provide the following benefits: the alignment, locking and supporting of rotating elements 15 on a shaft 20, longer lifetime of components involved; production of a tight fit between components, elimination of back and forth movement; elimination of destroyed components and wearing of material due to movement, elimination of damaged or broken keys 55 or keyways 60, provides a center lockdown on a shaft 20 for a rotating element 15 in the embodiment of an idler pulley or an idler gear which is not requiring a key 55; elimination of use of set screws and their associated loosening over time; the use on either very large or very small rotating elements 15 and shafts 20, and the use on all different types of metals including stainless steel.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A device for attaching a rotating element to a shaft, comprising:
    a central hub comprised of a continuous base and a semicircular-shaped removable collar, wherein said base and collar are centrally positioned within the rotating element to provide alignment and stability;
    a rotating element, chosen from the group consisting of a pulley, a gear, a coupling, a clutch, and a sprocket, which is connected to the shaft through a keyway;
        wherein this connection is secured by a conventional key held within the removable collar, offering a robust attachment capable of enduring varying speeds and torques;
    a plurality of multiple threaded fasteners for affixing the removable collar to the continuous base via corresponding through holes and threaded holes; and,
    a plurality of recessed areas located on the outer surface of the removable collar designed to house the threaded fasteners, strategically placed to maximize the contact area with the conventional key and the shaft, thus ensuring a friction fit that is reliable under various operational conditions; and,
    wherein the recessed areas are extended to accommodate two threaded fasteners per side, allowing for an adjustable and secure attachment method capable of handling increased speeds and torque;
    wherein the device is configured to facilitate the secure and adjustable attachment of various rotating elements the shaft by leveraging the semicircular-shaped removable collar and extended recessed areas for enhanced structural integrity and operational reliability; and,
    wherein this configuration ensures that the rotating element remains affixed to the shaft without rotational or axial slippage.

* * * * *